March 31, 1953     R. B. VOGT     2,633,226
HOOK CONVEYER
Filed April 20, 1949
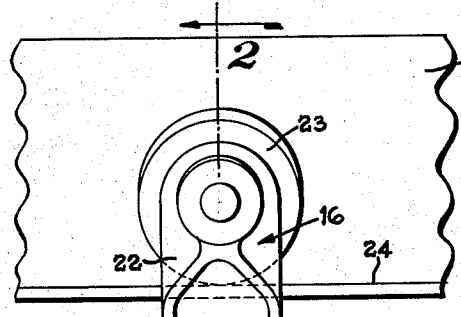
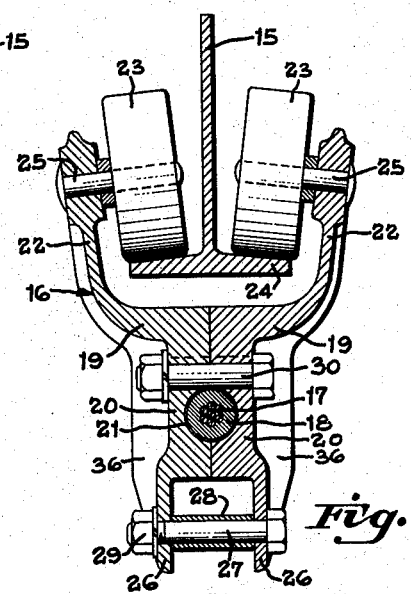
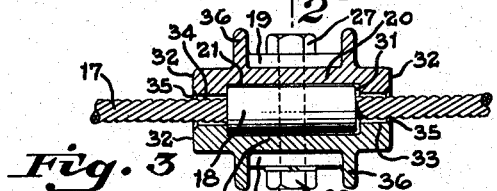
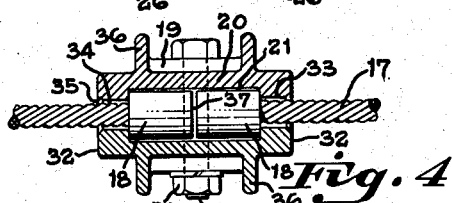
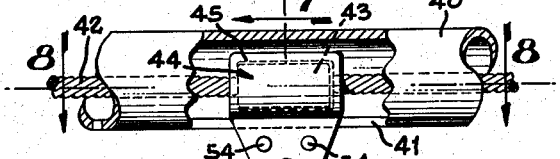
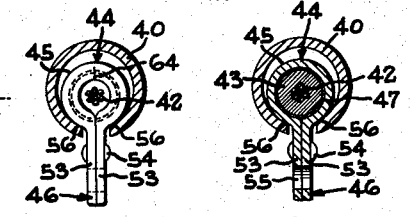
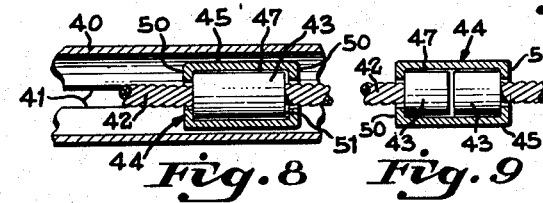
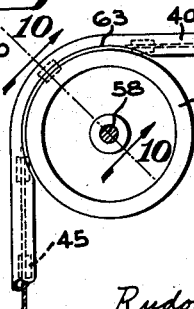
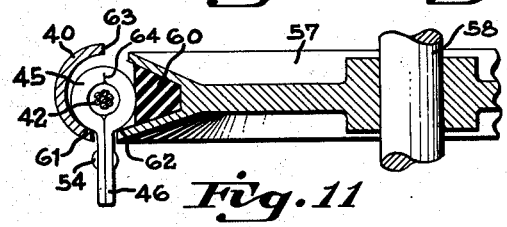
INVENTOR.
Rudolph B. Vogt
BY
Wood, Arey, Herron & Evans
ATTORNEYS.

Patented Mar. 31, 1953

2,633,226

UNITED STATES PATENT OFFICE 2,633,226

HOOK CONVEYER

Rudolph B. Vogt, Cincinnati, Ohio, assignor to The E. W. Buschman Company, Cincinnati, Ohio, a corporation of Ohio Application April 20, 1949, Serial No. 88,668

9 Claims. (Cl. 198—177)

This invention relates generally to improvements in overhead conveyor systems of the type constituting a flexible cable circuit having a series of work conveying trams anchored to the cable at fixed spacing, tracked upon a continuous guide rail or tramway. More particularly, the invention pertains to improvements in the trams or conveying units, combined with a cable having driving lugs fixed permanently upon the cable, whereby the conveying units are anchored positively to the cable and spaced accurately one from another. The improved arrangement provides also convenient means for positively coupling or splicing together the ends of the cable within the conveying members and an improved method of making a splice.

In the disclosure, the improved combination is embodied in two different classes of conveyor systems which exemplify preferred arrangements for practicing the invention, although the same concept can be applied to various other cable type conveyor systems. As applied to a conveyor of the trolley type, the trolley unit is generally similar to and interchangeable with the trolley structure disclosed in the co-pending application of Rudolph B. Vogt, Serial No. 643,652, and now Patent No. 2,556,487. A simplified structure following the same basic principles resides in a system which utilizes skids anchored to the cable instead of trolleys, the skids being slidably enclosed in a tubular housing or tramway.

In general, the trolley system constitutes a continuous rail, a series of trolleys having rollers tracked upon the rail and a stranded wire cable to which the trolleys are anchored and propelled along the rail. The cable is driven by engagement of the trolleys with sheaves or gears having notches or teeth, with the cable passing around the sheave at the turns so that each trolley is engaged and driven by the sheave in passing around it. In view of the fact that such systems frequently are quite extensive, considerable driving strain is improved on the individual trolley units, tending to displace them with respect to the cable. Slippage of the trolleys is critical since it destroys the registry of them with the notches of the driving sheave.

The primary objects have been to provide positive locking of the work conveying members to the cable to preserve their original spacing for the life of the conveyor system as distinguished from frictional engagement of the members, and to improve the means by which the ends of the cable are spliced or coupled by providing a positive anchorage for the ends of the cable within the conveying members instead of frictionally clamping the cable ends as practiced in the past.

In its preferred construction, the cable is fabricated in sections, for example, one hundred feet in length, with cylindrical lugs integrated with the cable at predetermined spacing. These lugs may be applied in any well known manner, for example by forming cylindrical aluminum extrusions having a central hole so that they may be slipped upon the cable, then compressed by means of dies to squeeze or swage the metal into the strands of the wire cable. It has been found that for all practical purposes the lugs under this treatment become an integral part of the cable, capable of withstanding a force equal to the tensile strength of the cable without shifting. One method of applying the lugs to the cable is disclosed in the patent to Alan C. Brickman, No. 2,464,432, in which is disclosed a compressible fitting for securing two cables or rods together.

In its preferred form, the present improvement resides in a trolley unit constituting mating half sections, each having a semi-circular cavity to nest over the cylindrical lug when the sections are placed together, with the end walls of the cavity in positive locking engagement with the ends of the lugs. The two sections are secured together by one or more bolts and there is provided clearance between the cavity and lug so that the lugs and cable sections are free to rotate relative to the trolley and each other. This relieves torsional strains to prolong the useful life of the cable, permits the trolley to float laterally relative to the cable and improves performance generally. This construction also permits either or both of the half sections to be removed from the cable for convenient replacement in case of wear or breakage without disturbing the established fixed centers of the driving lugs.

The simplified conveyor system utilizes a skid constituting essentially a cylindrical sheet metal shell having endwise flanges to engage the ends of the lug and a depending hanger to carry the work. As initially stamped, the shell is open so that it can be slipped over the lug and the open edges include limbs which are drawn together and secured by rivets or screws to form the hanger. In drawing the limbs together, the cylindrical housing is contracted around the lug with a circumferential clearance, with the flanges overhanging the ends of the lug to lock the shell positively to the lug. The cable assembly passes through a tubular tramway arranged to slidably support the lugs and having a slot through which the depending limbs project for attachment to work supporting brackets or the like. This provides a concealed system of particular advantage for light service where roller type trolleys are not required.

Further advantages and objects of the invention are disclosed in the following specification with reference to the drawings so that those skilled in the art will comprehend readily the various other modifications of which the invention is capable.

In the drawings:

Figure 1 is a fragmentary side elevation illustrating a portion of a conveyor rail, trolley unit and cable having driving lugs fixed upon the cable for anchoring the trolley to the cable.

Figure 2 is a cross sectional view taken on 2—2, Figure 1, further illustrating the structural details of the assembly.

Figure 3 is a longitudinal sectional view taken on line 3—3, Figure 1, further detailing the improved means for locking the trolley to the cable.

Figure 4 is a sectional view similar to Figure 3, illustrating the manner of coupling or splicing the ends of the cable within a trolley unit.

Figure 5 is a fragmentary side elevation partially in section, illustrating a simplified conveyor tram, constituting a skid slidably contained within a tubular tramway, utilizing the driving lugs for anchoring the skid to the cable.

Figure 6 is an end view of the assembly as projected from Figure 5.

Figure 7 is a cross sectional view taken on line 7—7, Figure 5.

Figure 8 is a longitudinal sectional view taken on line 8—8, Figure 5, further illustrating the details of the modified structure.

Figure 9 is a sectional view similar to Figure 8, illustrating the skid utilized as a connector to splice the ends of the cable.

Figure 10 is a top plan view illustrating somewhat diagrammatically the modified structure at one of the turns in the conveyor system, with cable and trams passing around an idler sheave.

Figure 11 is an enlarged fragmentary sectional view of the skid, tubular tramway and sheave, taken on line 10—10, further detailing the structure disclosed in Figure 10.

Referring to Figure 1, illustrating the improvements as applied to a trolley type, cable driven conveyor system, the structure in general constitutes an inverted T-shaped rail 15 for tracking the trolley units 16, which are anchored at spaced intervals to a stranded steel cable 17. The cable is powered by a sheave or gear (not shown) the periphery of which is toothed or notched to establish a driving engagement with the trolley units as they pass around the periphery of the sheave. It is necessary that the trolley units be anchored firmly, since the driving force for the entire conveyor system is transmitted from the sheave to the cable through the trolleys individually.

The trolleys 16 are anchored at fixed intervals, for example, at one foot spacing upon the cable by means of driving lugs 18. In the preferred form, these are cylindrical in form, although other shapes, such as spherical, can be used. The cylindrical lugs are attached preferably by shrinking them on the cable and for this purpose they are formed from tubular extrusions such as aluminum or other relatively soft metal, squeezed or compressed upon cable 17. The lugs may be affixed by any known method, for example, by slipping the lug tubes on the cable and compressing them between dies or jaws having mating cavities to swage them to the cable. This reduces the outside diameter of the lug and presses the metal into the strands of the cable under extremely high pressure, permanently uniting the lug to the cable so that it is capable of withstanding forces substantially equal to the tensile strength of the cable without slippage.

Described in detail with reference to Figures 1 to 4, each trolley 16 consists of a pair of one-piece duplicate half sections 19—19 formed as forgings or castings having mating blocks 20—20. Each block 20 includes a semi-circular cavity or recess and when the blocks are placed in facial contact, each recess nests upon opposite sides of the cylindrical lug 18, forming a lug bore with clearance 21 between bore and lug. Each half section 19 includes a trolley arm 22 rising vertically from the block portion and the upper end of each limb flares outwardly and includes a roller 23 tracked upon the flange 24 of the inverted T-shaped rail 15. The rollers 23 are mounted upon spindles 25 riveted permanently to the arms. The rollers are commercial products which include anti-friction ball bearings.

The lower end of each trolley half section includes a depending limb 26 arranged so that the limbs are spaced apart when the mating brackets are placed in assembly as shown in Figure 2. A bolt 27 is passed through the limbs with a spacer 28 placed upon the bolt to relieve the limbs of the clamping pressure of the bolt when the nut 29 is tightened. The bolt 27 provides a mount for a work supporting figure (not shown), such as a tray, rack, or hook as the particular installation may require. A second bolt 30 passes through the block portions 20—20 to clamp the mating sections together over the lug.

As shown in Figures 2 and 3, the cavities in the blocks 20 are slightly longer than the cylindrical lugs 18 to provide endwise clearance 31 between the lug and the ends of the cavity. The end walls 32—32 of the mating blocks further include semi-circular grooves 33 to provide a cable bore somewhat larger than the diameter of cable 17, having clearance 34 for the cable as indicated in Figure 3. Additionally, the ends of the grooves are chamfered as at 35 to eliminate the sharp corner at the end of the cable bore and thereby prevent the cable from being chafed as the cable passes around the sheaves in making turns. By reason of the clearance thus provided, the trolley floats slightly relative to the cable so as to be self-equalizing upon its rail, torque strains in the cable are relieved and the trolley unit is free from clamping stresses, being locked to the cable by direct endwise engagement with the lugs. Since the engagement of the trolleys with the cable does not depend upon clamping pressure of the bolts, it has been found that the single bolt 30 is sufficient to unite the two half sections, with bolt 27 supplementing bolt 30 and providing an anchorage for the hangers or work supporting fixtures. In order to rigidify the trolley sections, they are provided with ribs 36—36 along their opposite edges, extending from the upper ends of the arms 22 downwardly to the lower limbs 26.

As above noted, the trolley conveyors of the present type must be spaced accurately one from the other in order that they may engage the notches provided for them in the driving and idler sheaves. In the present construction, the lugs 18 are located by machine upon the cable at spacing held to uniformly close limits of tolerance. This simplifies the installation of the system since it is unnecessary to locate the trolley units by adjustment, since spacing is regulated by the lugs. By virtue of the duplicate one-piece construction of the mating trolley half sections 19, the cost of manufacture is kept at minimum and the installation of the conveyor system is simplified since it is necessary merely to place the half sections in position on opposite sides of the lugs and apply the bolts 27 and 30. Packing and shipping costs also are reduced because the cable may be shipped wound on reels and the trolley sections packed separately in boxes or barrels.

In practice, the lug and cable assembly may be furnished in one hundred foot sections, with the lugs spaced at one foot centers. These sections are spliced together in the manner illustrated in Figure 4. For this purpose the end lug of each cable section is cut in half, the overall length of the two halves being equal to the full length of a lug so that the clearance 37 (Figure 4) between the adjacent lug ends is equal to the end clearance 31 (Figure 3) of the regular lugs. The mating sections 19 therefore provide an efficient coupling fixture so that the splice in the cable may be located at one or several points in the conveyor system with the strength of the cable unimpaired by the splices. It will be noted also that the splice permits the adjoining ends of the cable to rotate relative to each other so that there are no torsional strains developed in the cable.

By constructing the trolley brackets in duplicate and bolting the mating pieces together, several important advantages are provided. After prolonged usage, it sometimes occurs that a roller will wear out and require replacement. The repair can be made most conveniently by loosening the bolts 27 and 30 and replacing the worn section with a new one without disturbing the setting of the trolley assembly with respect to the cable. The manner in which the ends of the cables are spliced also simplifies the original installation of a closed circuit conveyor since splices are made simply by severing the lugs of adjoining cables to make up any required length. In the example above given, a required number of hundred foot cable sections may be joined together at several trolley units and if the circuit cannot be completed by a full length section, the gap may be closed by cutting a length of cable for the number of lugs required and cutting the end lugs in half to mate with the end lugs of the main cable sections. Also, in case of cable breakage, the first lug at the ends adjacent the break may be cut in half and a one foot length of cable with halved lugs inserted to splice the broken section. In each of the cases above noted, the original spacing of the trolley units is preserved so that registry with the teeth or notches of the sheaves is maintained.

The conveyor structure disclosed in Figures 5 to 10 inclusive follows generally the principles described above and is designed to provide a light duty conveyor system which may be installed in establishments such as stores, offices, or light manufacturing plants for conveying merchandise, mail and other light articles. One important feature of this system is that all moving parts are enclosed in a slotted tube, the only exposed part being a hanger or lug which depends from the tube to sustain the articles to be conveyed. As disclosed, the tube, lug and skid are cylindrical in cross section but the parts also can be made square or rectangular in cross section if desired.

The system constitutes a conduit or tube 40 having a continuous slot 41 in its under side. A light weight wire cable 42 passes through the tube and includes a series of compressed or swaged cylindrical lugs 43, smaller than the lugs 18, pressed upon the cable in spaced relationship in the manner above described. In place of the trolley assembly 16, the work supporting tram consists of a skid made from a simple sheet metal stamping 44 providing a shroud or housing 45 surrounding the lug 43 and including a depending hanger 46, the stamping 44 being slidably enclosed in the tube 40, with the hanger 46 depending downwardly through the slot 41. The internal diameter of the housing is slightly larger than the outside diameter of lug 43 to provide circumferential clearance 47 (Figures 7 and 8) and the housing further is provided with end walls 50—50, providing shoulders for positive engagement by the lug. The end walls are spaced to provide endwise clearance 51 between the lug and walls.

In practice, the member 44 is partially formed by a stamp and die operation with the housing 45 expanded and the respective limbs 53—53 spread apart sufficiently so that the member can be slipped over the diameter of the lug. The limbs 53 then are pressed together to contract the housing 45 upon the lug and the limbs are secured permanently together by installing rivets or screws 54—54 (Figures 5 and 6). The hanger portion thus formed is provided with an aperture 55 which may be formed either by punching the limbs prior to assembly or by punching the aperture after the limbs are riveted together.

As shown in Figures 6 and 7, the skid units 45 are slidably supported in the tube 40 at points 56—56 alongside the slot 41. In order to minimize friction, it is preferable to form the tube from sheet steel and the skid members 45 from a relatively soft material such as brass or aluminum. By reason of service requirements, it would be impractical to apply lubrication due to the probability of the lubricant dripping from the tube and causing damage to the articles in transit.

The cables are spliced together in the same manner as practiced in conjunction with the trolley assembly, by severing adjoining lugs and coupling them together by engagement of the sheet metal housing 45 as shown in Figure 9, with the lug sections confined against endwise movement by the end walls 50—50.

The turns in this conveyor system are made by passing the cable around an idler sheave 57 (Figure 10) which is secured upon a rotatable shaft 58. As detailed in Figure 11, the sheave has a V-shaped groove in which is seated a resilient V-belt 60 which engages one side of the skid 45. The lower portion of the skid is supported in sliding engagement as at 61 against the tube 40 and by the lower flange 62 of the pulley. In order to accommodate the periphery of the sheave, a half section of the tube is cut away as at 63 (Figure 10) at a radius somewhat larger than the radius of the sheave to provide clearance. The driving sheave (not shown) is provided with notches or teeth arranged to mesh with the skids to provide a positive drive substantially in the same manner as outlined with reference to the trolleys.

The sheet metal skids may be installed very conveniently by the use of a hand tool engageable with the limbs for drawing them together to contract the housing over the lug. To reduce resistance in compressing the housing, the end walls 50—50 may include one or several V-shaped notches which close as indicated at 64 (Figure 6) when the housing is contracted. Removal of the skid for replacement can be accomplished readily by a companion tool designed for expanding the limbs. By reason of facial engagement of the limbs, they serve not only to provide hangers for the work supporting fixtures but they also control the degree to which the housing 45 may be contracted and thus maintain the predetermined clearance between the diameter of the lug and housing to relieve cable strain. This structure also is designed for assembly in the field since the fixed driving lugs maintain positive spacing of the skids. The cable sections can be shipped in coils or wound on spools and the skids shipped separately in bulk, as noted with reference to the trolleys and cable.

Having described my invention, I claim:

1. A conveyor system comprising, a cable loop constituting individual sections of cable prefabricated to provide a series of cylindrical driving lugs permanently joined thereto in spaced relationship with each other, a series of conveyor trams adapted to be placed transversely over the driving lugs, each of said trams having work supporting means and a cylindrical cavity adapted to receive one of the driving lugs in nested engagement therein, said cavity being sufficiently larger in diameter than the driving lugs to provide a rotatable connection and including end walls providing a positive driving engagement with the opposite ends of the lug, the opposite ends of the cable sections having cylindrical coupling lugs substantially one half the length of said driving lugs, and duplicating the driving lugs when placed in end to end relationship said cavities being adapted to confine rotatably the coupling lugs of adjacent cable sections to anchor the ends of the cable sections within a conveyor tram whereby the cable sections within the conveyor loop are independently rotatable with respect to one another in response to torsional strains.

2. A conveyor system comprising, a cable loop constituting individual sections of cable prefabricated to provide a series of cylindrical driving lugs permanently joined thereto in spaced relationship with each other, the cylindrical driving lugs having substantially right angular opposite ends a series of conveyor trams each having work supporting means and having a cylindrical cavity adapted to receive one of the driving lugs in nested engagement therein, said cavity including substantially right angular end walls providing a positive driving engagement with the opposite ends of the lug, the opposite ends of the cable sections having cylindrical coupling lugs substantially one-half the length of said driving lugs, said cavities being adapted to receive the coupling lugs of adjacent cable sections to anchor the ends of the cable sections within a conveyor tram, the cavities being sufficiently larger than the driving and coupling lugs to provide longitudinal and circumferential clearance for the coupling lugs whereby the cable sections are free to rotate relative to each other to relieve torsional strains within the cable loop.

3. A conveyor system comprising, a cable loop constituting sections of cable prefabricated to provide a series of cylindrical driving lugs compressed permanently upon the cable in spaced relationship to one another, a conveyor trolley adapted to be anchored upon said cable by engagement with said lugs, said trolleys constituting mating half sections of duplicate form, each of said half sections having a semi-cylindrical cavity in its mating face to receive a lug, and semi-cylindrical grooves of smaller diameter opening into the opposite ends of the cavity to receive the cable, said cylindrical lugs having right angular opposite ends and the semi-cylindrical cavities having right angular opposite ends walls, the diameter and length of the cavity in assembly being greater than the diameter and length of the cylindrical lug to provide a rotatable, but positive driving engagement whereby the sections of cable are individually rotatable with respect to one another said sections adapted to be placed in facial engagement with each other upon opposite sides of the cable to enclose the lug in nested engagement within said cavity, and means for securing said half sections together to lock the trolley in positive driving engagement with the lug and in fixed relationship with each other.

4. A conveyor system comprising, a prefabricated cable having a series of driving lugs permanently united with the cable in spaced relationship with one another, conveyor trams each constituting a sheet metal stamping having a housing adapted to establish a positive driving engagement with a lug, a work hanger formed as an integral part of the housing, and a tubular tramway arranged to slidably support the conveyor trams, the tramway including a slot to provide clearance for the hangers with the hangers depending through said slot for conveying work pieces.

5. A conveyor system comprising, a prefabricated cable having a series of cylindrical driving lugs permanently united with the cable in spaced relationship with one another, conveyor trams each constituting a sheet metal stamping having a cylindrical housing having end walls adapted to establish a positive driving engagement with a lug with circumferential clearance around the lug, a work supporting hanger formed as an integral part of the housing and a cylindrical tramway arranged to slidably support and enclose the conveyor trams, the tramway including a slot to provide clearance for the hangers with the hangers depending through said slot for conveying work pieces.

6. A conveyor system comprising, a prefabricated cable having a series of driving lugs permanently united with the cable in spaced relationship with one another, conveyor trams each constituting a sheet metal stamping having a housing section provided with an opening adapting the housing section to be slipped over a lug, the housing section including end flanges adapted to establish a positive driving engagement with the ends of the lug, a pair of limbs joined to the housing section along the opposite edges of said opening, said limbs being adapted for engagement by a tool to contract the housing section over the lug and to control the contraction of the housing to provide clearance between the lug and the contracted housing, and means for securing the limbs together in facial contact to provide work supporting hangers.

7. A conveyor system comprising, a prefabricated cable having a series of driving lugs permanently united with the cable in spaced relationship with one another, conveyor trams each constituting a sheet metal stamping having a housing adapted to establish a positive driving engagement with a lug, a tubular tramway adapted to slidably support and enclose said trams, an idler sheave for making a turn in the conveyor system, the sheave having a pair of flanges to receive the trams, the tramway having a curved portion extending partially around the sheave, the curved portion being open to the periphery of the sheave whereby the trams are slidably supported upon the edge of the tramway and lower flange of the sheave in passing around the turn.

8. A conveyor system comprising, a prefabricated cable having a series of driving lugs permanently united with the cable in spaced relationship with one another, conveyor trams each constituting a sheet metal stamping having a housing adapted to establish a positive driving engagement with a lug, and including a work hanger, a tubular tramway adapted to slidably support and enclose said trams and including a slot to receive the work hanger with the hanger extending outwardly from the tramway, an idler sheave for making a turn in the conveyor system, the sheave having a pair of flanges with a resilient belt seated between the flanges to establish a yieldable contact with the trams, the tramway having a curved portion extending partially around the periphery of the sheave, the curved portion being severed longitudinally complementary to the periphery of the sheave with the severed portion open to the sheave, the trams being slidably supported upon the edge of the slot and lower flange of the sheave in passing around the turn.

9. A conveyor system comprising, a plurality of individual prefabricated stranded wire cable sections each having a series of cylindrical driving lugs permanently swaged thereon in spaced relationship with one another, the opposite ends of each of said cable sections having a coupling lug substantially one-half the length of said driving lugs adapted to be placed in end to end relationship to provide in assembly a substantial duplicate of the driving lugs, a series of duplicate conveyor trolleys, one for each of said driving lugs and for said paired coupling lugs, each of said trolleys constituting interchangeable mating half sections, each of said half sections including a complementary cavity of semi-cylindrical shape adapted to provide in assembly a cylindrical bore having opposite ends arranged to rotatably confine the driving and paired coupling lugs therein whereby the individual cable sections are rotatable with respect to one another, and a bolt passing through the mating half sections on an axis at right angles to the said cylindrical bore arranged to secure the half sections in clamped relationship over the coupling and driving lugs, the mating half sections being arranged to be applied upon the cable sections from opposite sides thereof and thereby to install and remove the trolleys without disturbing adjacent trolleys.

RUDOLPH B. VOGT.

REFERENCES CITED

The following references are of record in the file of this patent:

UNITED STATES PATENTS

| Number | Name | Date |
| --- | --- | --- |
| 548,504 | Beach et al. | Oct. 22, 1895 |
| 1,059,124 | Doxford | Apr. 15, 1913 |
| 1,804,923 | Fernekes et al. | May 12, 1931 |
| 2,017,404 | Lorig | Oct. 15, 1935 |
| 2,095,022 | Bishop | Oct. 5, 1937 |

FOREIGN PATENTS

| Number | Country | Date |
| --- | --- | --- |
| 622,808 | Great Britain | May 6, 1949 |